(12) United States Patent
Sampath et al.

(10) Patent No.: US 9,100,254 B2
(45) Date of Patent: Aug. 4, 2015

(54) METHOD AND SYSTEM FOR TRANSMIT UPSAMPLING VIA IFFT

(75) Inventors: Hemanth Sampath, San Diego, CA (US); Sunil K. Kandukuri Narayan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 770 days.

(21) Appl. No.: 12/408,631

(22) Filed: Mar. 20, 2009

(65) Prior Publication Data

US 2009/0245422 A1  Oct. 1, 2009

Related U.S. Application Data

(60) Provisional application No. 61/040,579, filed on Mar. 28, 2008.

(51) Int. Cl.
*H04L 27/12* (2006.01)
*H04L 27/26* (2006.01)

(52) U.S. Cl.
CPC ........ *H04L 27/2628* (2013.01); *H04L 27/2644* (2013.01)

(58) Field of Classification Search
CPC .............. H04B 1/0021; H04L 27/2628; H04L 27/2644
USPC ........................... 375/260, 295, 355; 341/122
See application file for complete search history.

(56) References Cited

U.S. PATENT DOCUMENTS

| | | | |
|---|---|---|---|
| 6,359,938 B1 | 3/2002 | Keevill et al. | |
| 6,411,653 B1 * | 6/2002 | Arunachalam et al. | 375/260 |
| 7,206,350 B2 | 4/2007 | Korobkov et al. | |
| 7,769,102 B2 * | 8/2010 | Chan | 375/295 |
| 2003/0169807 A1 * | 9/2003 | Straeussnigg | 375/222 |
| 2004/0243258 A1 | 12/2004 | Shattil | |

(Continued)

FOREIGN PATENT DOCUMENTS

| | | |
|---|---|---|
| CN | 1466287 A | 1/2004 |
| JP | 7226724 A2 | 8/1995 |

(Continued)

OTHER PUBLICATIONS

International Search Report and Written Opinion—PCT/US2009/038148—ISA/EPO—Aug. 13, 2009.

(Continued)

*Primary Examiner* — Shuwang Liu
*Assistant Examiner* — Ross Varndell
(74) *Attorney, Agent, or Firm* — Abdollah Katbab (57) ABSTRACT

A technique for eliminating from or reducing the complexity of an upsampler/interpolator of a transmit system. In general, the technique involves configuring an IFFT to perform both the conversion of a modulated signal from frequency to time domain, and at least a portion of the upsampling from the first sampling rate towards the sampling rate of a DAC. In one embodiment, the IFFT is configured to have a bandwidth substantially equal to the sampling rate of a DAC. In this embodiment, the upsampler/interpolator may be totally eliminated. In another embodiment, the IFFT is configured to have a bandwidth that is greater than the first sampling rate of the modulated signal, and lower than the sampling rate of the DAC. In this embodiment, a simpler upsampler/interpolator may be employed to perform the remaining upsampling from the IFFT bandwidth to the sampling rate of the DAC.

36 Claims, 8 Drawing Sheets

(56) References Cited

U.S. PATENT DOCUMENTS

| | | |
|---|---|---|
| 2005/0053165 A1 | 3/2005 | Lakkis |
| 2005/0225460 A1* | 10/2005 | Jensen ............................ 341/61 |
| 2006/0034377 A1 | 2/2006 | Chan |
| 2006/0215540 A1* | 9/2006 | Krishnamoorthi et al. ... 370/208 |
| 2007/0133698 A1 | 6/2007 | Jung et al. |
| 2008/0043866 A1* | 2/2008 | Mujtaba ........................ 375/260 |
| 2009/0206940 A1* | 8/2009 | Collados Asensio et al. 332/103 |
| 2011/0044160 A1 | 2/2011 | Mujtaba |

FOREIGN PATENT DOCUMENTS

| | | |
|---|---|---|
| JP | 8331101 A2 | 12/1996 |
| WO | WO2006099324 A1 | 9/2006 |
| WO | WO2007144806 A2 | 12/2007 |

OTHER PUBLICATIONS

Lindeberg_Jonne_et_al: "OFDM modulator with digital IF and on-chip DIA-converter" Custom Integrated Circuits Conference, 2006. CICC '06. IEEE, Sep. 10-13, 2006, pp. 527-530, 1-4244-0075-9.

Taiwan Search Report—TW098109948—TIPO—Apr. 23, 2012.

Yeo D L G et al: "Low power implementation of FFT/ IFFT processor for IEEE 802.1 1a wireless LAN transceiver", Communication Systems, 2002. ICCS 2002. The 8th International Conference, Nov. 25-28, 2002, vol. 1, pp. 250-254, ISBN: 0-7803-7510-6.

Taiwan Search Report—TW098109948—TIPO—Oct. 11, 2012.

* cited by examiner

METHOD AND SYSTEM FOR TRANSMIT UPSAMPLING VIA IFFT

CROSS REFERENCE TO A RELATED APPLICATION

This application claims the benefit of the filing date of Provisional Application, Ser. No. 61/040,579, filed on Mar. 28, 2008, and entitled "Method and System for Transmit Upsampling via IFFT," which is incorporated herein by reference.

FIELD

This disclosure relates generally to communication systems, and in particular, a method of transmitting data by performing upsampling of the data by clocking an inverse Fast Fourier Transform (IFFT) at a rate much higher than the rate of the input data.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point (AP) to extract transmit beamforming gain on the forward link when multiple antennas are available at the access point (AP).

Often, in such communication systems, a transmitter includes several components for conditioning outgoing data for transmission via a wireless medium. Such components may include, for example, a modulator for generating complex symbols from the outgoing data, and an inverse Fast Fourier Transfer (IFFT) for converting the complex symbols from frequency domain to time domain. Additional processing may occur in the time domain, such as cyclic prefix addition, windowing, overlap, and add of windowed symbols. Then, the outgoing signal is upsampled and processed by a digital-to-analog converter (DAC) to produce an analog signal. This analog signal is then further filtered and upconverted in the analog domain to generate a radio frequency (RF) signal for transmission into the wireless medium via an antenna.

In many systems, the DAC is typically operating at a sampling frequency (rate) much higher than the baseband system bandwidth (referred to herein as the first sampling rate). As an example, in one implementation, the baseband system bandwidth can be 10 MHz and the DAC sampling frequency (rate) can be 160 MHz. The reasons for such a high sampling rate are two-fold: (1) Large sampling rate ensures that the images in frequency domain are well-separated from the baseband signal spectrum; and (2) the baseband signal spectrum undergoes minimal distortion due to the DAC low-pass "Sync" filter, by ensuring that the stop-band of the Sync filter is much higher than the baseband signal spectrum.

In many systems, a time-domain upsampler/interpolator is employed to upsample the outgoing signal to the DAC sampling rate. The time-domain upsampler/interpolator is typically a series of time-domain filters with several time-domain taps. Upsampling/interpolation involves convolving the baseband signal with these time-domain filters, which are clocked at frequencies smaller than or equal to the DAC sampling frequency. These operations are computationally intensive and consume substantial power.

As an example, the first sampling rate may be 10 MHz, and the DAC sampling rate may be 160 MHz. The time-domain upsampling/interpolator needs to upsample the time domain from 10 MHz to 160 MHz—a factor of 16. This can be computationally intensive. Accordingly, it would be desirable to completely eliminate the time-domain upsampler/interpolator or significantly reduce its complexity, while at the same time, achieve the desired sampling rate for the transmitted signal.

SUMMARY

An aspect of the present disclosure relates to a technique for eliminating a time-domain upsampler/interpolator from a transmit system. In general, the technique entails configuring an inverse fast Fourier Transfer (IFFT) to perform not only the conversion of a modulated signal from a frequency domain to a time domain, but also the upsampling of signal from a first sampling rate to the DAC sampling rate. The first sampling rate is typically substantially equal to the baseband system bandwidth. In particular, the technique involves increasing the IFFT bandwidth to substantially equal to the DAC sampling rate.

In one embodiment, a transmit system employing the above technique may comprise: (1) A modulator (e.g., OFDM, OFDMA, CDMA, SC-FDM, TDM, etc., modulator) adapted to generate a modulated signal with a first sampling rate. It shall be understood that an OFDM or OFDMA modulator generates the signal in the frequency domain, whereas a CDMA, SC-FDM or TDM modulator may generate the signal in the time-domain. If the modulator generates the signal in the time-domain, then an FFT with bandwidth equal to the first sampling rate is employed to convert the signal to frequency domain. (2) An IFFT adapted to convert the modulated signal from the frequency-domain to the time-domain by using an IFFT bandwidth substantially equal to the DAC sampling rate. (3) A post-IFFT processing module adapted to perform specified processing (e.g., automatic gain control (AGC), cyclic prefix and window addition, overlapping and adding, etc.) on the time-domain modulated signal; (4) a digital-to-analog converter (DAC) adapted to convert the processed time-domain modulated signal from a digital domain to an analog domain. And, (5) an analog front-end adapted to further filter and upconvert the analog baseband signal to an RF signal that can be transmitted into a wireless medium.

Another aspect of the present disclosure relates to a technique for reducing the complexity of a time-domain upsampler/interpolator of a transmit system. In general, the technique entails configuring the IFFT engine in the above embodiment, with a bandwidth (also referred to herein as the second sampling rate) that is smaller than the DAC frequency, and higher than the first sampling rate of the baseband signal. A post-IFFT processing module is adapted to perform specified processing (e.g., AGC, cyclic prefix and window addition, overlapping and adding, etc.) on the time-domain modulated signal. Next, a time-domain upsampler/interpolator may then be employed to perform upsampling of data from the second sampling rate to the DAC sampling rate.

Due to the reduced upsampling requirements of this upsampler/interpolator, the number of time-domain taps used are also reduced, thereby lowering computational complexity and processing power used. It shall be understood that this embodiment may be used if the modem already has an IFFT instantiated with a certain bandwidth limitation to be used in the transmitter datapath for example. In this case, it is more efficient to re-use the IFFT engine rather than instantiate another IFFT with a bandwidth substantially equal to the DAC sampling rate.

As an example of this embodiment, the first sampling rate may be 10 MHz, the second sampling rate (e.g., the IFFT bandwidth) may be 40 MHz, and the DAC sampling rate may be 160 MHz. Assuming tone-spacing of the IFFT to be 10 KHz, the IFFT size is given as 40 MHz/10 KHz=4000. As previously discussed, typically, the IFFT size is rounded up to the nearest power of two (2), which in this example is 4096. The time-domain data generated at the output of the IFFT has a sampling of 40 MHz. Hence, the time-domain upsampling/interpolator need only to upsample the time-domain data from 40 MHz to 160 MHz—a factor of four (4). This may be accomplished by a reduced complexity time-domain interpolator/upsampler with a smaller number of taps.

Other aspects, advantages and novel features of the present disclosure will become apparent from the following detailed description of the disclosure when considered in conjunction with the accompanying drawings.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
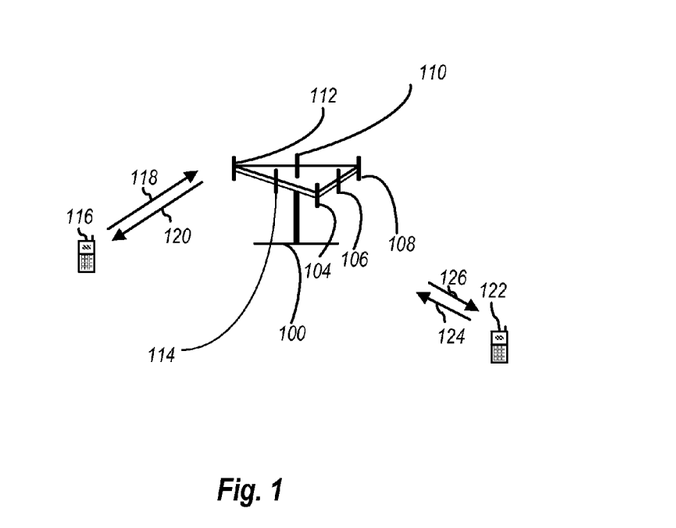
FIG. 1 illustrates an exemplary multiple access wireless communication system according to an aspect of the disclosure.

Referring to FIG. 1, an exemplary multiple access wireless communication system according to an aspect of the disclosure is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called a user equipment (UE), a wireless communication device, terminal, or some other terminology.

Figure 2:
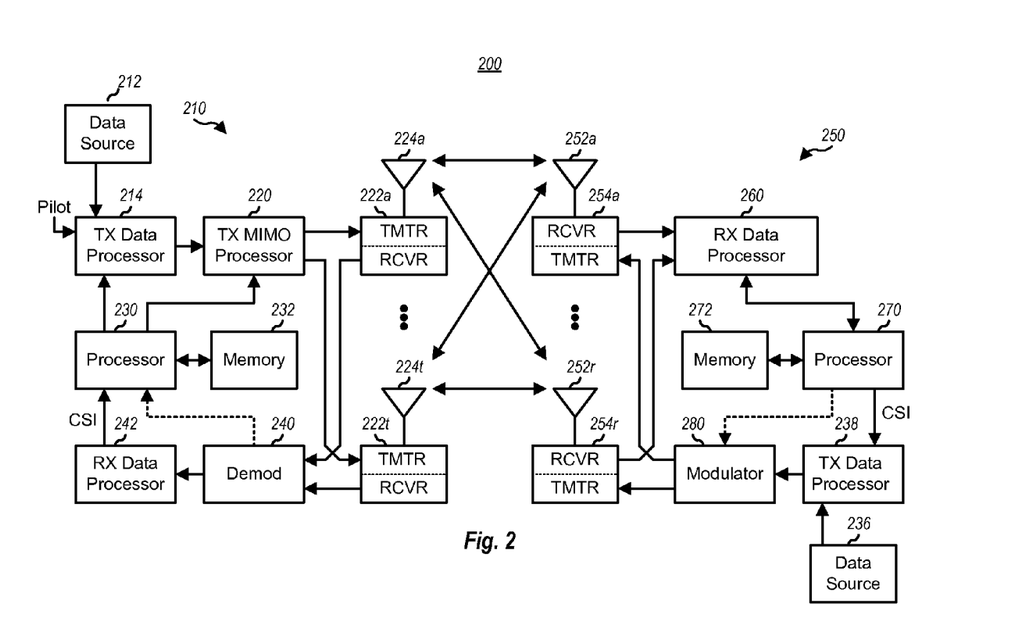
FIG. 2 illustrates a block diagram of an exemplary communication system according to another aspect of the disclosure.

FIG. 2 illustrates a block diagram of an embodiment of an exemplary transmitter system 210 (also known as the access point) and a receiver system 250 (also known as access terminal) in a MIMO system 200 in accordance with another aspect of the disclosure. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beam forming weights then processes the extracted message.

Almost all wireless communication system transmitters upsample the signal before it is transmitted onto the airwaves. For example, a 10 MHz digital input signal can be upsampled with a time-domain interpolation filter to arrive at the desired rate, for example, 160 MHz. Therefore, the upsampler in such a system will typically be matched to the transmit bandwidth. Because of this, if the transmit bandwidth is increased, for example, in an OFDMA deployment, then the upsampler rate may also be increased, which increases the cost of the system. Methods and systems are described herein that offer an elegant solution to this problem.

In most wireless systems, there is an IFFT transformation of the signal waveform into the time-domain before it is upsampled. It is noted, however, that if the IFFT engine is clocked at a high enough frequency, then it can operate as an upsampler. That is, for example, using a 160 MHz IFFT engine, the IFFT engine can perform upsampling on the input signal to arrive at a 160 MHz transmit bandwidth signal. If the transmit bandwidth is 160 MHz, then by using the IFFT as an upsampler, the need for an independent upsampler can be obviated. These and other improvements will be evident in the following descriptions.

Figure 3A:
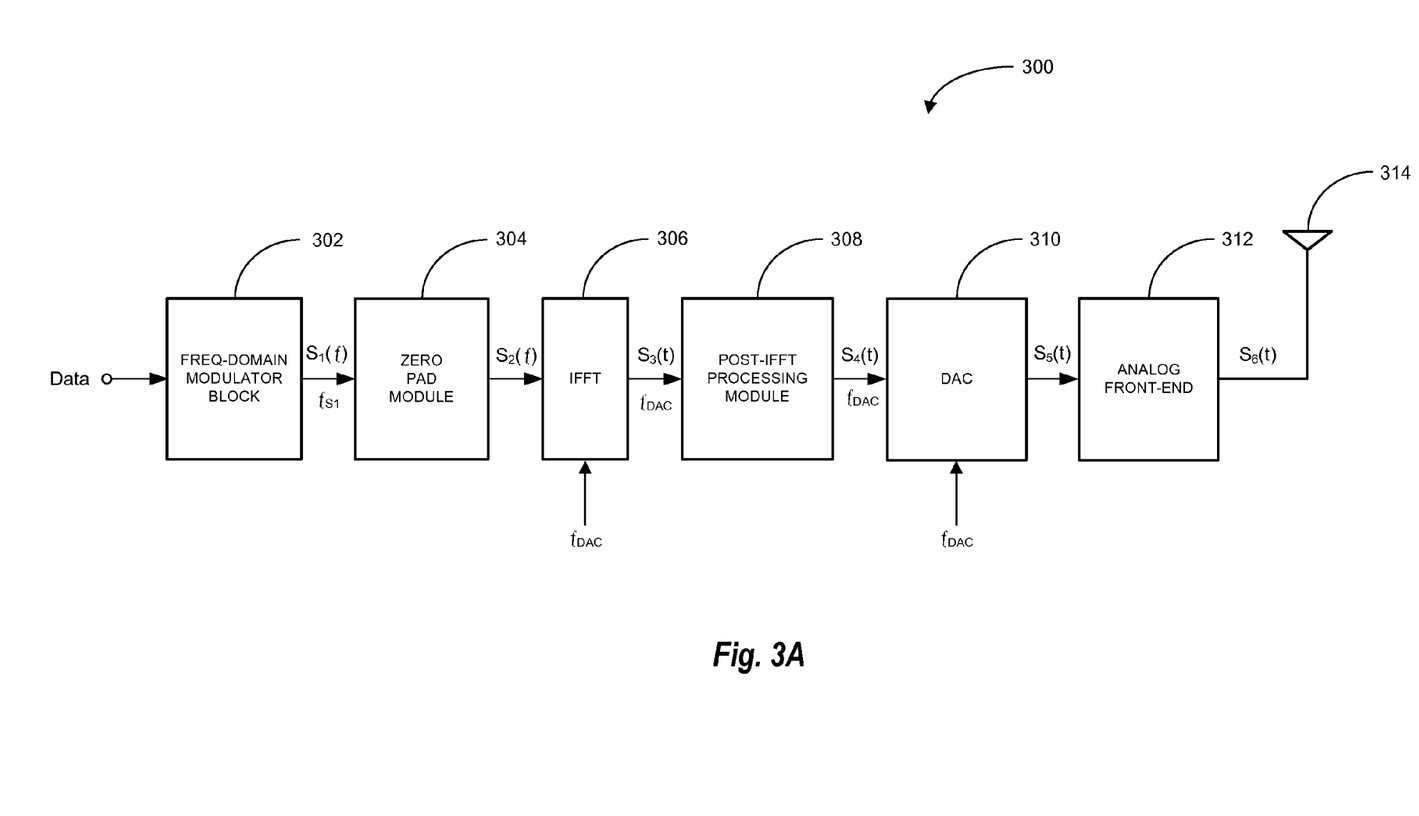
FIG. 3A illustrates a block diagram of an exemplary transmit system according to an aspect of the disclosure.

FIG. 3A illustrates a block diagram of an exemplary transmit system 300 in accordance with another aspect of the disclosure. The transmit system 300 may be employed in the transmitter system 210, such as one present in an access point (AP). Alternatively, or in addition to, the transmit system 300 may be employed in the receiver system 250, such as one present in an access terminal (AT).

In particular, the transmit system 300 comprises a frequency-domain modulator block 302, a zero pad module 304, an inverse Fast Fourier Transform (IFFT) 306, a post-IFFT processing module 308, a digital-to-analog converter (DAC) 310, an analog front-end 312, and an antenna 314. The frequency-domain modulator block 302 generates a frequency-domain modulated signal $S_1(f)$ with a first sampling rate $f_{S1}$ from input data. In this case, the first sampling rate is the baseband signal bandwidth. The modulator block 302 may employ any number of frequency-domain modulations (e.g., OFDM, OFDMA, etc.) to generate the modulated signal $S_1(f)$. It shall be understood that the input data may have been coded, interleaved, converted to signal constellations, and applied other or additional processing.

The zero pad module 304 adds one or more zeros to the modulated signal $S_1(f)$ so that the resulting modulated signal $S_2(f)$ has a block size substantially the same as the size of the IFFT 306. The IFFT 306 converts the frequency-domain modulated signal $S_2(f)$ to a time-domain modulated signal $S_3(t)$ by using a sampling rate (i.e., the IFFT bandwidth) that is substantially equal to the sampling rate $f_{DAC}$ of the DAC 310. The post-IFFT processing module 308 performs specified processing (e.g., automatic gain control (AGC), cyclic prefix and window addition, overlapping and adding, etc.) on the time-domain modulated signal $S_3(t)$ to generate a processed time-domain modulated signal $S_4(t)$. The DAC 310 converts the processed time-domain modulated signal $S_4(t)$ from the digital domain to the analog domain, to generate a resulting analog signal $S_5(t)$. The analog front-end 312 further filters and upconverts the analog signal $S_5(t)$ to generate an RF signal $S_6(t)$ for transmission into a wireless medium via the antenna 314.

As an example of this embodiment, the first sampling rate of the $f_{S1}$ frequency-domain modulated signal $S_1(f)$ may be 10 MHz, and the IFFT sampling rate or bandwidth being substantially the same as the sampling rate $f_{DAC}$ of the DAC 310, may be 160 MHz. The size of the IFFT 306 may be determined using the following equation:

$$IFFTsize = 2^{\left[log_2\left(\frac{f_{DAC}}{f_{ToneSpacing}}\right)\right]} \quad \text{Eq. 1}$$

Assuming that the tone-spacing of the IFFT 306 is 10 KHz, then, according to Eq. 1, the IFFT size is 16,384.

Figure 3B:
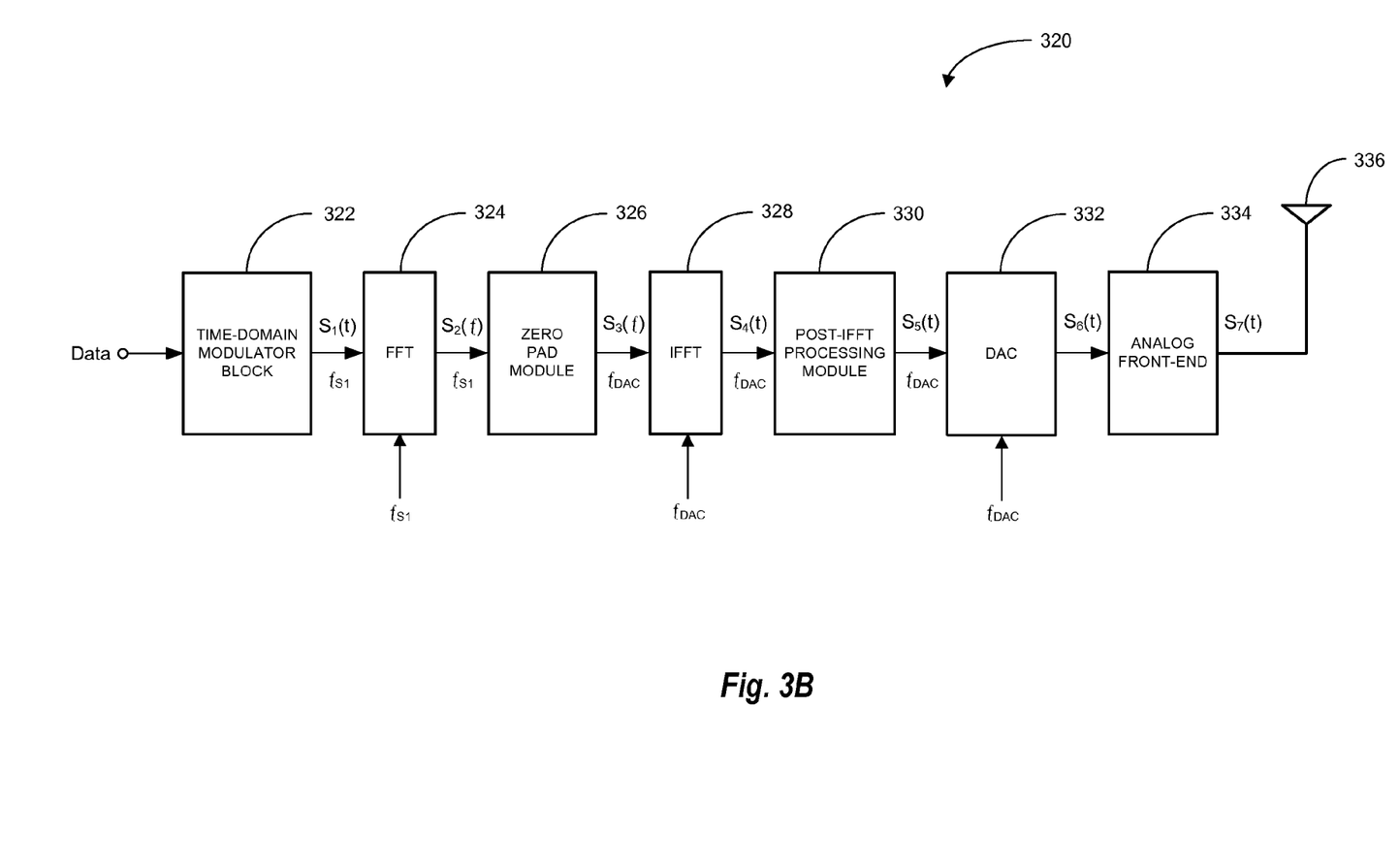
FIG. 3B illustrates a block diagram of another exemplary transmit system according to another aspect of the disclosure.

FIG. 3B illustrates a block diagram of another exemplary transmit system 320 in accordance with another aspect of the disclosure. As with the previous embodiment, the transmit system 320 may be employed in the transmitter system 210, such as one present in an access point (AP). Alternatively, or in addition to, the transmit system 320 may be employed in the receiver system 250, such as one present in an access terminal (AT).

In particular, the transmit system 320 comprises a time-domain modulator block 322, an FFT 324, a zero pad module 326, an IFFT 328, a post-IFFT processing module 330, a DAC 332, an analog front-end 334, and an antenna 336. The time-domain modulator block 322 generates a time-domain modulated signal $S_1(t)$ with a first sampling rate $f_{S1}$ from input data. The modulator block 322 may employ any number of time-domain modulations (e.g., CDMA, SC-FDM, TDM, etc.) to generate the modulated signal $S_1(t)$. It shall be understood that the input data may have been coded, interleaved, converted to signal constellations, and applied other or additional processing.

The FFT 324 converts the time-domain modulated signal $S_1(t)$ into a frequency-domain modulated signal $S_2(f)$ with a sampling rate (e.g., the FFT bandwidth) substantially the same as the first sampling rate $f_{S1}$. The zero pad module 326 adds one or more zeros to the modulated signal $S_2(f)$ so that the resulting modulated signal $S_3(f)$ has a block size substantially the same of the IFFT 328. The IFFT 328 converts the frequency-domain modulated signal $S_3(f)$ into a time-domain modulated signal $S_4(t)$ by a sampling rate (e.g., the IFFT bandwidth) that is substantially equal to the sampling rate $f_{DAC}$ of the DAC 332. The post-IFFT processing module 330 performs specified processing (e.g., AGC, cyclic prefix and window addition, overlapping and adding, etc.) on the time-domain modulated signal $S_4(t)$ to generate a processed time-domain modulated signal $S_5(t)$. The DAC 332 converts the processed time-domain modulated signal $S_5(t)$ from the digital domain to the analog domain to generate a resulting analog signal $S_6(t)$. The analog front-end 334 further filters and upconverts the analog signal $S_6(t)$ to generate an RF signal $S_7(t)$ for transmission into a wireless medium via the antenna 336.

Figure 3C:
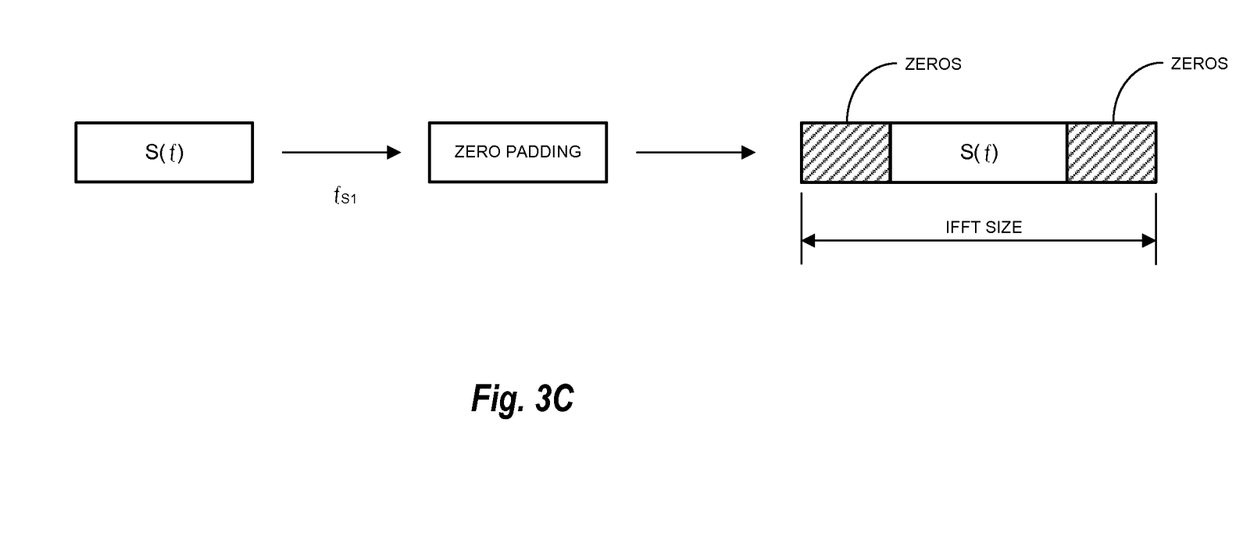
FIG. 3C illustrates a diagram illustrating an operation of an exemplary zero pad module according to another aspect of the disclosure.

FIG. 3C illustrates a diagram illustrating an operation of an exemplary zero pad module according to another aspect of the disclosure. In the embodiments described herein, the zero pad module adds one or more zeros, but usually a plurality of zeros, to a block of the corresponding frequency-domain modulated signal S(f). The amount of zeros added is such that the resulting size of the modulated signal block is substantially the same size as the corresponding IFFT. In this examples, half of the zeros is added on one size of the block, and the other half is added to the opposite size of the block, as shown.

Figure 4A:
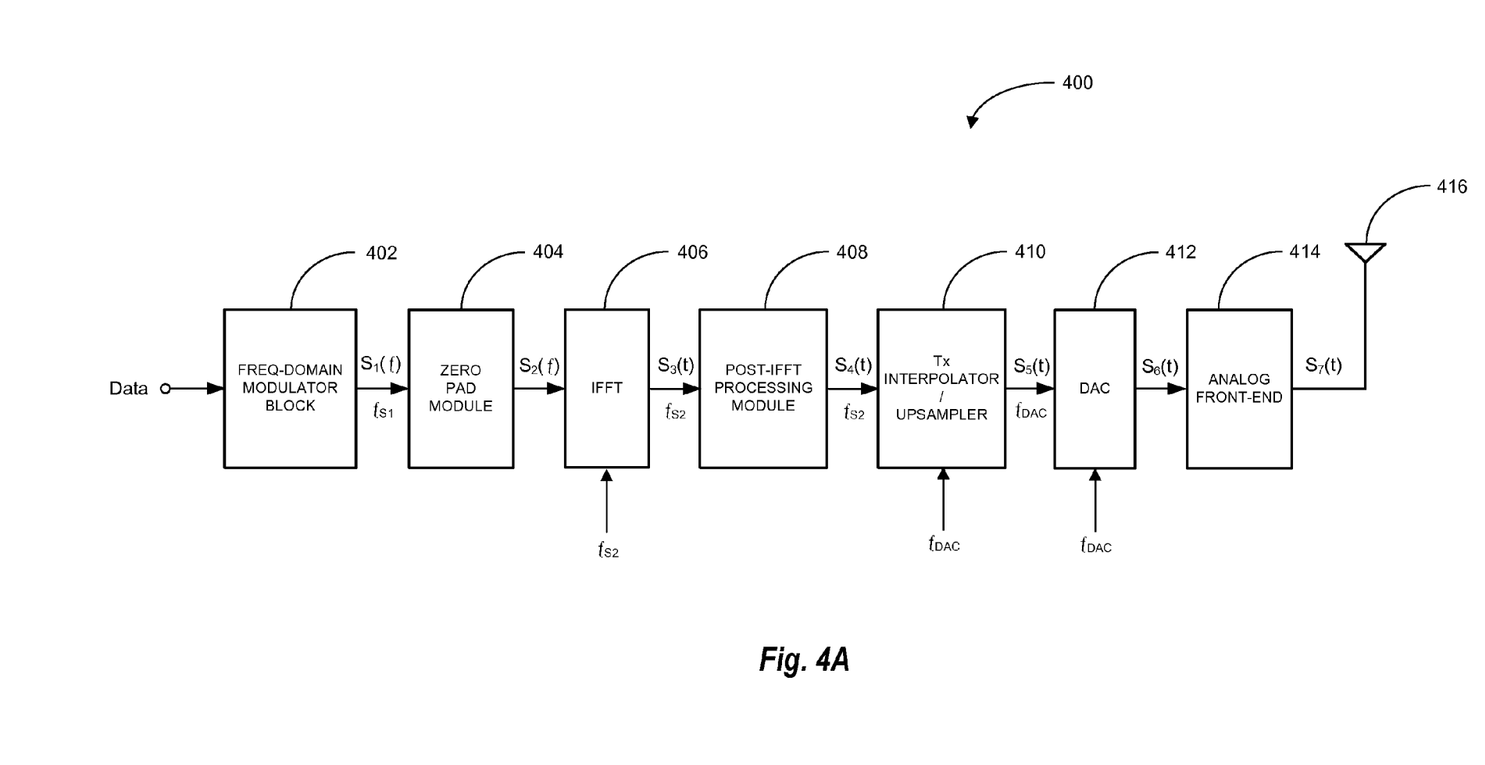
FIG. 4A illustrates a block diagram of another exemplary transmit system according to another aspect of the disclosure.

FIG. 4A illustrates a block diagram of an exemplary transmit system 400 in accordance with another aspect of the disclosure. As with the prior embodiments, the transmit system 400 may be employed in the transmitter system 210, such as one present in an access point (AP). Alternatively, or in addition to, the transmit system 400 may be employed in the receiver system 250, such as one present in an access terminal (AT).

In particular, the transmit system 400 comprises a frequency-domain modulator block 402, a zero pad module 404, an IFFT 406, a post-IFFT processing module 408, a transmitter (Tx) time-domain interpolator/upsampler 410, a DAC 412, an analog front-end 414, and an antenna 416. The frequency-domain modulator block 402 generates a frequency-domain modulated signal $S_1(f)$ with a first sampling rate $f_{S1}$ from input data. As with embodiment 300, the modulator block 302 may employ any number of frequency-domain modulations (e.g., OFDM, OFDMA, etc.) to generate the modulated signal $S_1(f)$. It shall be understood that the input data may have been coded, interleaved, converted to signal constellations, and applied other or additional processing.

The zero pad module 404 adds one or more zeros to the modulated signal $S_1(f)$ so that the resulting modulated signal $S_2(f)$ has a block size substantially the same size as the size of the IFFT 406. The IFFT 406 converts the frequency-domain modulated signal $S_2(f)$ to a time-domain modulated signal $S_3(t)$ by using a second sampling rate $f_{S2}$ (e.g., the IFFT bandwidth) that is greater than the first sampling rate $f_{S1}$ and less than the sampling rate $f_{DAC}$ of the DAC 412. The post-IFFT processing module 408 performs specified processing (e.g., AGC, cyclic prefix and window addition, overlapping and adding, etc.) on the time-domain modulated signal $S_3(t)$ to generate a processed time-domain modulated signal $S_4(t)$. The time-domain interpolator/upsampler 410 upsamples the processed time-domain modulated signal $S_4(t)$ so that the resulting modulated signal S$_5$(t) has a sampling rate substantially equal to the sampling rate f$_{DAC}$ of the DAC 412. The DAC 412 converts the processed time-domain modulated signal S$_6$(t) from the digital domain to the analog domain, to generate a resulting analog signal S$_6$(t). The analog front-end 414 further filters and upconverts the analog signal S$_6$(t) to generate an RF signal S$_7$(t) for transmission into a wireless medium via the antenna 416.

As an example of this embodiment, the first sampling rate f$_{S1}$ of the frequency-domain modulated signal S$_1$(f) may be 10 MHz, the second sampling rate f$_{S2}$ or IFFT bandwidth may be 40 MHz, and the sampling rate f$_{DAC}$ of the DAC 412 may be 160 MHz. The size of the IFFT 406 may be determined using the following equation:

$$IFFTsize = 2^{\left\lceil \log_2\left(\frac{f_{S2}}{f_{ToneSpacing}}\right) \right\rceil}$$  Eq. 2

Assuming a tone-spacing of the IFFT 406 is 10 KHz, then, according to Eq. 2, the IFFT size is 4096.

Figure 4B:
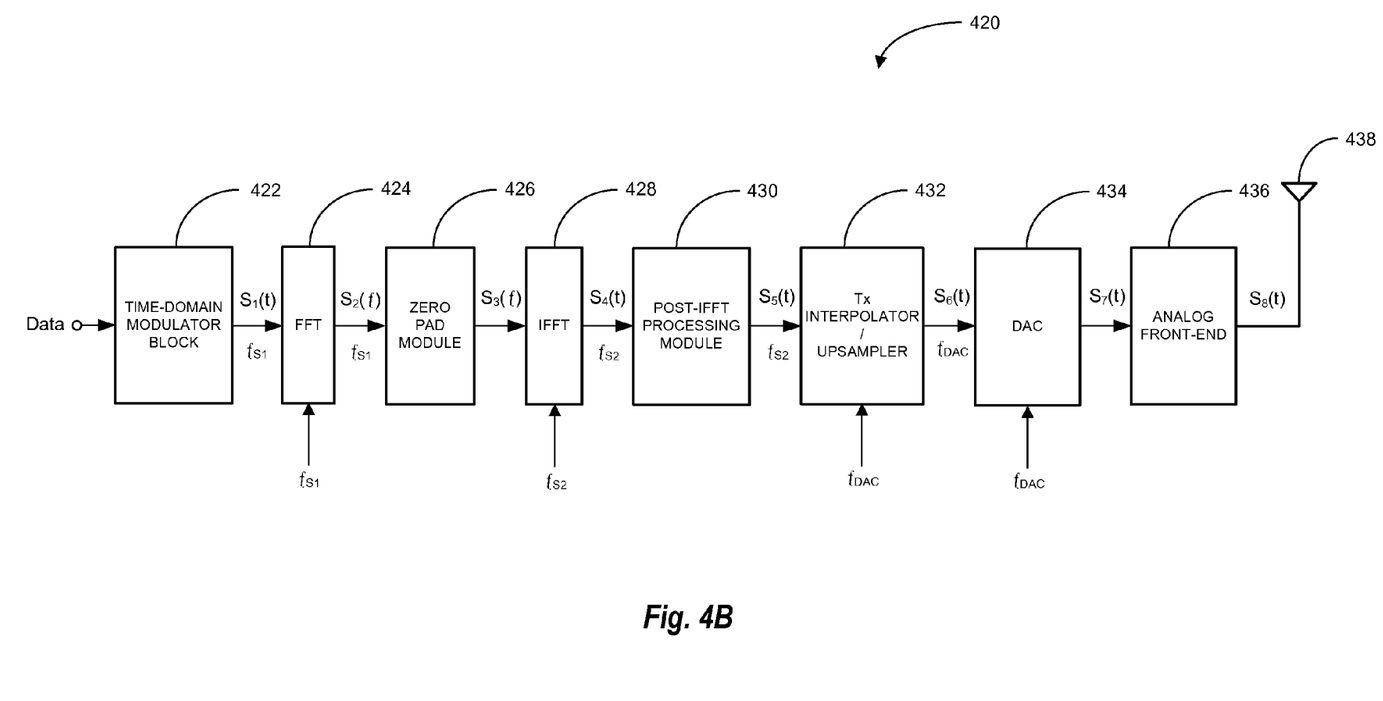
FIG. 4B illustrates a block diagram of another exemplary transmit system according to another aspect of the disclosure.

FIG. 4B illustrates a block diagram of another exemplary transmit system 420 in accordance with another aspect of the disclosure. As with the previous embodiment, the transmit system 420 may be employed in the transmitter system 210, such as one present in an access point (AP). Alternatively, or in addition to, the transmit system 420 may be employed in the receiver system 250, such as one present in an access terminal (AT).

In particular, the transmit system 420 comprises a time-domain modulator block 422, an FFT 424, a zero pad module 426, an IFFT 428, a post-IFFT processing module 430, a Tx time-domain interpolator/upsampler 432, a DAC 434, an analog front-end 436, and an antenna 438. The time-domain modulator block 422 generates a time-domain modulated signal S$_1$(t) with a first sampling rate f$_{S1}$ from input data. The modulator block 422 may employ any number of time-domain modulations (e.g., CDMA, SC-FDM, TDM, etc.) to generate the modulated signal S$_1$(t). It shall be understood that the input data may have been coded, interleaved, converted to signal constellations, and applied other or additional processing.

The FFT 424 converts the time-domain modulated signal S$_1$(t) into a frequency-domain modulated signal S$_2$(f) by using a sampling rate (e.g., the FFT bandwidth) substantially the same as the first sampling rate f$_{S1}$. The zero pad module 426 adds one or more zeros to the modulated signal S$_2$(f) so that the resulting modulated signal S$_3$(f) has a block size substantially the same size as the size of the IFFT 428. The IFFT 428 converts the frequency-domain modulated signal S$_3$(f) into a time-domain modulated signal S$_4$(t) by using a second sampling rate f$_{S2}$ (e.g., the IFFT bandwidth) that is greater than the first sampling rate f$_{S1}$ and less than the sampling rate f$_{DAC}$ of the DAC 434. The post-IFFT processing module 430 performs specified processing (e.g., AGC, cyclic prefix and window addition, overlapping and adding, etc.) on the time-domain modulated signal S$_4$(t) to generate a processed time-domain modulated signal S$_5$(t). The time-domain interpolator/upsampler 432 upsamples the processed time-domain modulated signal S$_5$(t) so that the resulting modulated signal S$_6$(t) has a sampling rate substantially equal to the sampling rate f$_{DAC}$ of the DAC 434. The DAC 434 converts the processed time-domain modulated signal S$_6$(t) from the digital domain to the analog domain to generate a resulting analog signal S$_7$(t). The analog front-end 436 further filters and upconverts the analog signal S$_7$(t) to generate an RF signal S$_8$(t) for transmission into a wireless medium via the antenna 438.

Figure 5A:
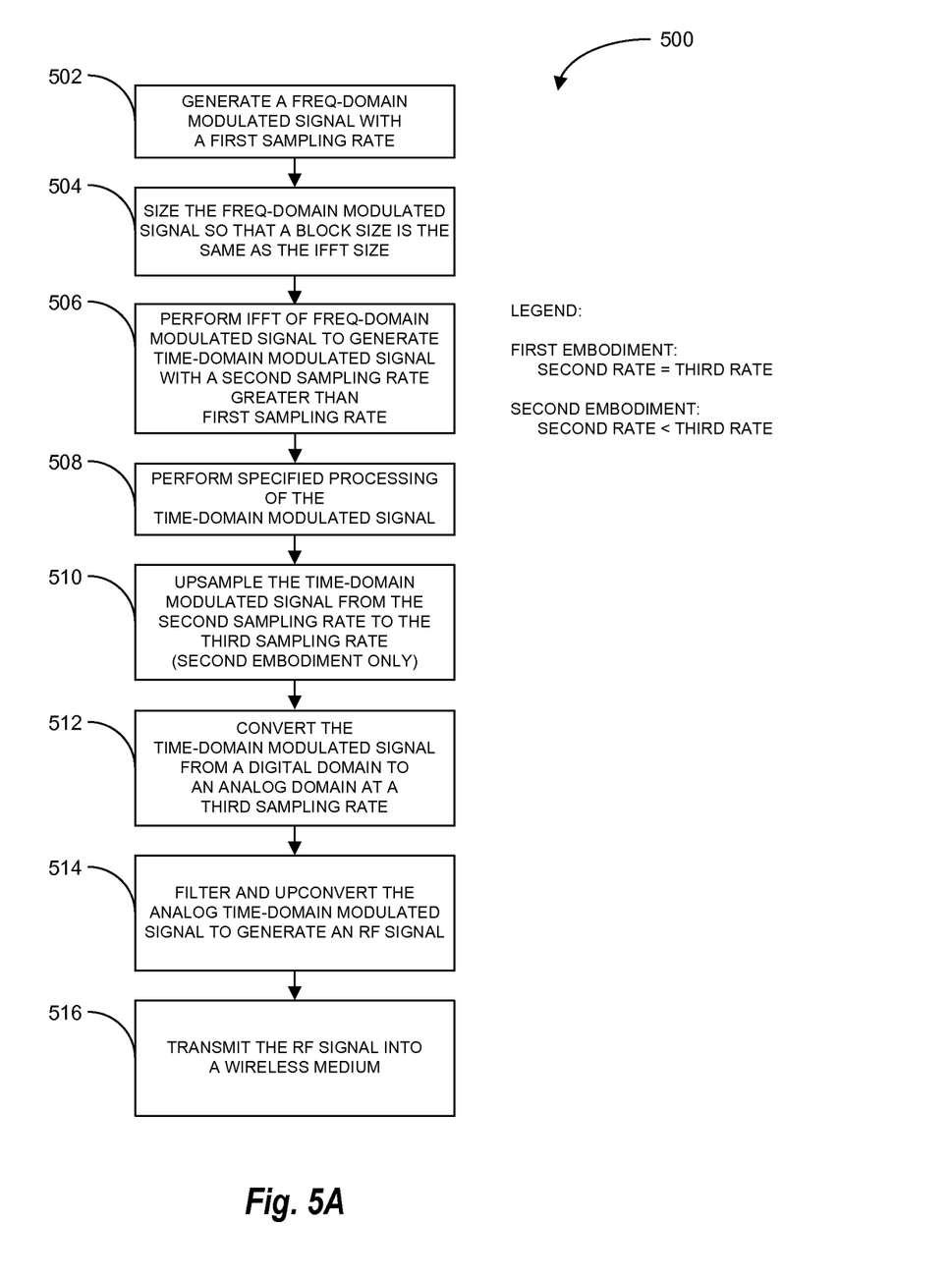
FIG. 5A illustrates a flow diagram of an exemplary method of transmitting an RF signal according to another aspect of the disclosure.

FIG. 5A illustrates a flow diagram of an exemplary method 500 of transmitting an RF signal according to another aspect of the disclosure. The method 500 summarizes the operations of embodiments 300 and 400 that include a frequency-domain modulator. The method 500 may be implemented using software or code operating on a computer-like system, dedicated hardware, or any combination thereof.

According to the method 500, a frequency-domain modulated signal is generated with a first sampling rate by, for example, an OFDM or OFDMA modulator (block 502). Then, a block of the frequency-domain modulated signal is resized, for example by padding zeros, so that it is the substantially same as an IFFT size (block 504). Then, an IFFT is performed on the resized frequency-domain modulated signal to generate a time-domain modulated signal with a second sampling rate greater than the first sampling rate (block 506). In a first embodiment, the second sampling rate is substantially the same as a third sampling rate of a DAC, as discussed further herein. In a second embodiment, the second sampling rate is less than the third sampling rate of the DAC.

Then, specified processing is performed on the time-domain modulated signal (e.g., AGC, cyclic prefix and window addition, overlapping and adding, etc.) (block 508). Then, in the case of the second embodiment, the processed time-domain modulated signal is upsampled from the second sampling rate to the third sampling rate (block 510). Then, the processed time-domain modulated signal is converted from digital to analog using, for example, a DAC operating at the third sampling rate (block 512). Then, the analog time-domain modulated signal is filtered and upconverted to generate an RF signal (block 514). Then, the RF signal is transmitted into a wireless medium for one or more remote communication devices (block 516).

Figure 5B:
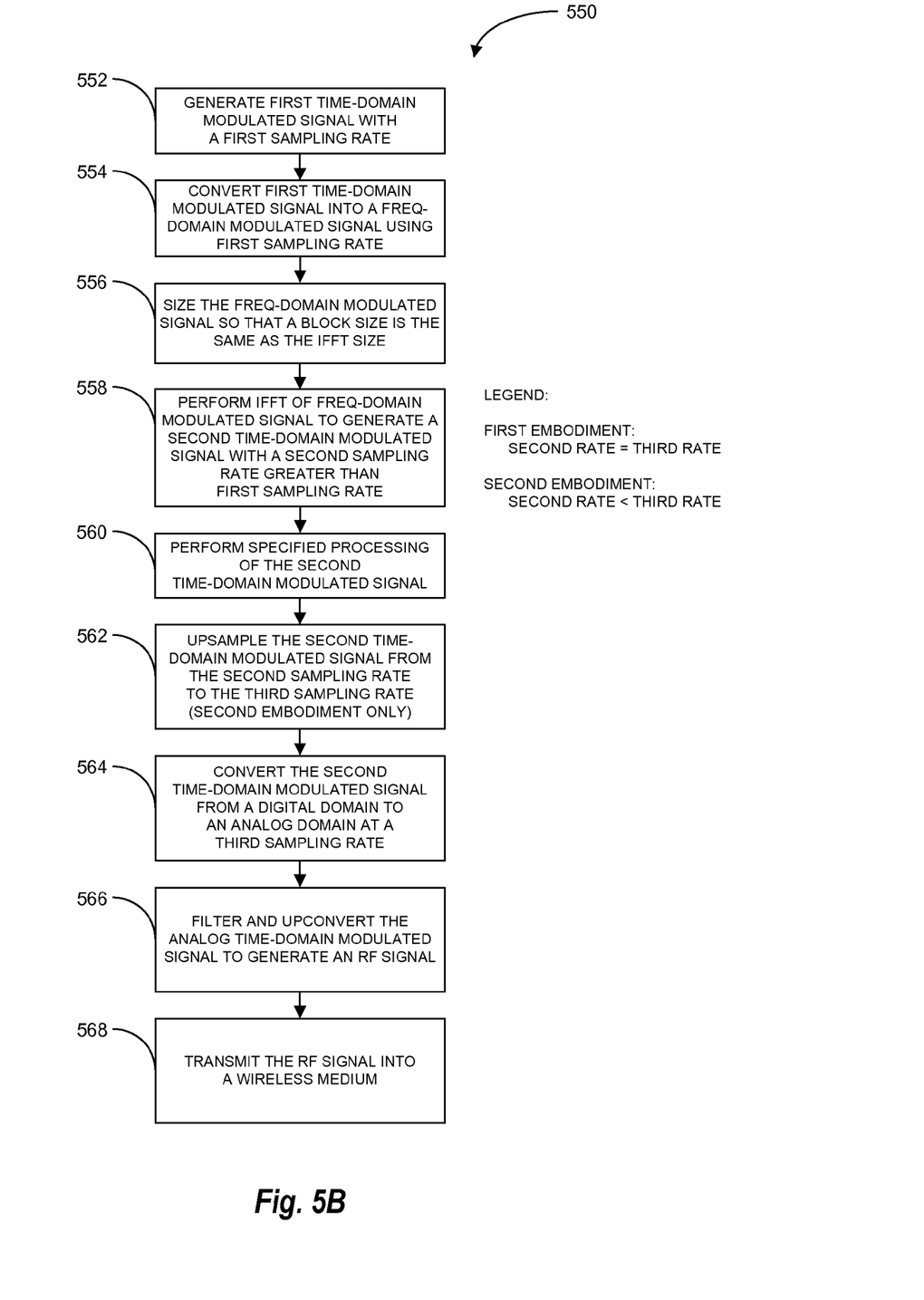
FIG. 5B illustrates a flow diagram of another exemplary method of transmitting an RF signal according to another aspect of the disclosure.

FIG. 5B illustrates a flow diagram of another exemplary method 550 of transmitting an RF signal according to another aspect of the disclosure. The method 550 summarizes the operations of embodiments 320 and 420 that include a time-domain modulator. The method 550 may be implemented using software or code operating on a computer-like system, dedicated hardware, or any combination thereof.

According to the method 550, a first time-domain modulated signal is generated with a first sampling rate by, for example, a CDMA, SC-FDM, or TDM modulator (block 552). Then, the first time-domain modulated signal is converted into a frequency-domain modulated signal by, for example, an FFT operated at the first sampling rate (block 554). Then, a block of the frequency-domain modulated signal is resized, for example by padding zeros, so that it is the substantially same as an IFFT size (block 556). Then, an IFFT is performed on the resized frequency-domain modulated signal to generate a second time-domain modulated signal with a second sampling rate greater than the first sampling rate (block 558). In a first embodiment, the second sampling rate is substantially the same as a third sampling rate of a DAC, as discussed further herein. In a second embodiment, the second sampling rate is less than the third sampling rate of the DAC.

Then, specified processing is performed on the second time-domain modulated signal (e.g., AGC, cyclic prefix and window addition, overlapping and adding, etc.) (block 560). Then, in the case of the second embodiment, the processed time-domain modulated signal is upsampled from the second sampling rate to the third sampling rate (block 562). Then, the processed time-domain modulated signal is converted from digital to analog using, for example, a DAC operating at the third sampling rate (block 564). Then, the analog time-domain modulated signal is filtered and upconverted to generate an RF signal (block 566). Then, the RF signal is transmitted into a wireless medium for one or more remote communication devices (block 568).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, changes in energy states, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An apparatus for transmitting a radio frequency (RF) signal, comprising:
    a frequency-domain modulator adapted to generate a frequency-domain modulated signal with a first sampling rate;
    an inverse fast Fourier Transform (IFFT) module adapted to convert the frequency-domain modulated signal to a time-domain modulated signal at a second sampling rate that is greater than the first sampling rate, wherein the second sampling rate is chosen toward a desired sampling rate for a transmitted signal; and
    a digital-to-analog converter (DAC) adapted to convert the time-domain modulated signal from a digital domain to an analog time-domain modulated signal at a third sampling rate,
    wherein the third sampling rate is substantially the same as the second sampling rate if the second sampling rate is substantially the same as the desired sampling rate for the transmitted signal, or the third sampling rate is greater than the second sampling rate if the second sampling rate is lower than the desired sampling rate for a transmitted signal, such that to achieve the desired sampling rate for the transmitted signal, and the RF signal is based on the analog time-domain modulated signal.

2. The apparatus of claim 1, wherein the first sampling rate is approximately 10 MHz, and the second sampling rate is approximately 160 MHz.

3. The apparatus of claim 1, wherein the frequency-domain modulator comprises an orthogonal frequency division multiple access (OFDMA) modulator, an orthogonal frequency division multiplexing (OFDM) modulator, or a combination thereof.

4. The apparatus of claim 1, further comprising a time-domain modulator adapted to generate a second time-domain modulated signal, wherein the frequency-domain modulator is adapted to generate the frequency-domain modulated signal from the second time-domain modulated signal.

5. The apparatus of claim 4, wherein the time-domain modulator comprises a code division multiple access (CDMA) modulator, a single carrier frequency division multiplexing (SC-FDM) modulator, a time division multiplexing (TDM) modulator, or a combination thereof.

6. The apparatus of claim 1, further comprising a post-IFFT processing module adapted to perform a specified processing of the time-domain modulated signal produced by the IFFT.

7. The apparatus of claim 6, wherein the specified processing comprises one or more of the following: automatic gain control, cyclic prefix and window addition, overlapping and adding on the time-domain modulated signal, or a combination thereof.

8. The apparatus of claim 1, further comprising an analog front-end adapted to generate the RF signal from an output of the DAC.

9. The apparatus of claim 1, further comprising an antenna adapted to transmit the RF signal into a wireless medium.

10. The apparatus of claim 1, wherein the second sampling rate is sixteen times greater than the first sampling rate.

11. The apparatus of claim 1, further comprising a time-domain upsampler/interpolator adapted to upsample the digital time-domain modulated signal from the second sampling rate to the third second sampling rate if the second sampling rate is less than the third sampling rate.

12. The apparatus of claim 11, wherein the first sampling rate is approximately 10 MHz, the second sampling rate is approximately 40 MHz, and the third sampling rate is approximately 160 MHz.

13. A method of transmitting a radio frequency (RF) signal, comprising:
generating a frequency-domain modulated signal having a first sampling rate;
converting the frequency-domain modulated signal into a time-domain modulated signal at a second sampling rate that is greater than the first sampling rate using an inverse fast Fourier Transform (IFFT) module, wherein the second sampling rate is chosen toward a desired sampling rate for a transmitted signal; and
converting the time-domain modulated signal from a digital domain to an analog time-domain modulated signal at the third sampling rate,
wherein the third sampling rate is substantially the same as the second sampling rate if the second sampling rate is substantially the same as the desired sampling rate for the transmitted signal, or the third sampling rate is greater than the second sampling rate if the second sampling rate is lower than the desired sampling rate for a transmitted signal, such that to achieve the desired sampling rate for the transmitted signal,
and the RF signal is based on the analog time-domain modulated signal.

14. The method of claim 13, wherein the first sampling rate is approximately 10 MHz, and the second sampling rate is approximately 160 MHz.

15. The method of claim 13, wherein generating the frequency-domain modulated signal comprises performing orthogonal frequency division multiple access (OFDMA) modulation, orthogonal frequency division multiplexing (OFDM) modulation, or a combination thereof.

16. The method of claim 13, further comprising generating a second time-domain modulated signal from which the frequency-modulated signal is generated.

17. The method of claim 16, wherein generating the second time-domain modulated signal comprises performing a code division multiple access (CDMA) modulation, a single carrier frequency division multiplexing (SC-FDM) modulation, a time-division multiplexing (TDM) modulation, or a combination thereof.

18. The method of claim 13, further comprising performing a specified processing of the time-domain modulated signal.

19. The method of claim 18, wherein the specified processing comprises one or more of the following: automatic gain control, cyclic prefix and window addition, overlapping and adding to the time-domain modulated signal, or a combination thereof.

20. The method of claim 13, further comprising upconverting the analog time-domain modulated signal to the RF signal.

21. The method of claim 13, further comprising transmitting the RF signal into a wireless medium.

22. The method of claim 13, wherein the second sampling rate is sixteen times greater than the first sampling rate.

23. The method of claim 13, further comprising upsampling the digital time-domain modulated signal from the second sampling rate to the third sampling rate if the second sampling rate is less than the third sampling rate.

24. The method of claim 23, wherein the first sampling rate is approximately 10 MHz, the second sampling rate is approximately 40 MHz, and the third sampling rate is approximately 160 MHz.

25. An apparatus for transmitting a radio frequency (RF) signal, comprising:
means for generating a frequency-domain modulated signal with a first sampling rate;
means for converting the frequency-domain modulated signal into a time-domain modulated signal at a second sampling rate greater than the first sampling rate, wherein the second sampling rate is chosen toward a desired sampling rate for a transmitted signal; and
means for converting the time-domain modulated signal from a digital domain to an analog time-domain modulated signal at a third sampling rate,
wherein the third sampling rate is substantially the same as the second sampling rate if the second sampling rate is substantially the same as the desired sampling rate for the transmitted signal, or the third sampling rate is greater than the second sampling rate if the second sampling rate is lower than the desired sampling rate for a transmitted signal, such that to achieve the desired sampling rate for the transmitted signal, and
the RF signal is based on the analog time-domain modulated signal.

26. The apparatus of claim 25, wherein the first sampling rate is approximately 10 MHz, and the second sampling rate is approximately 160 MHz.

27. The apparatus of claim 25, wherein the means for generating the frequency-domain modulated signal comprises means for performing orthogonal frequency division multiple access (OFDMA) modulation, orthogonal frequency division multiplexing (OFDM) modulation, or a combination thereof.

28. The apparatus of claim 25, further comprising means for generating a second time-domain modulated signal from which the frequency-domain modulated signal is generated.

29. The apparatus of claim 28, wherein the means for generating the second time-domain modulated signal comprises means for performing code division multiple access (CDMA) modulation, means for performing single carrier frequency division multiplexing (SC-FDM) modulation, means for performing time division multiplexing (TDM) modulation, or a combination thereof.

30. The apparatus of claim 25, further comprising means for performing a specified processing of the time-domain modulated signal.

31. The apparatus of claim 30, wherein the means for performing the specified processing comprises one or more of the following: means for performing automatic gain control, means for cyclic prefix and window addition, means for overlapping and adding to the time-domain modulated signal, or a combination thereof.

32. The apparatus of claim 25, further comprising means for upconverting the analog time-domain modulated signal to generate the RF signal.

33. The apparatus of claim 25, further comprising means for transmitting the RF signal into a wireless medium.

34. The apparatus of claim 25, further comprising means for upsampling the digital time-domain modulated signal from the second sampling rate to the third sampling rate if the second sampling rate is less than the third sampling rate.

35. The apparatus of claim 34, wherein the first sampling rate is approximately 10 MHz, the second sampling rate is approximately 40 MHz, and the third sampling rate is approximately 160 MHz.

36. A computer readable product, comprising:
   a non-transitory computer-readable medium comprising:
   code for causing a computer to generate a frequency-domain modulated signal with a first sampling rate;
   code for causing the computer to convert the frequency-domain modulated signal into a time-domain modulated signal at a second sampling rate greater than the first sampling rate, wherein the second sampling rate is chosen toward a desired sampling rate for a transmitted signal; and
   code for causing the computer to convert the time-domain modulated signal from a digital domain to an analog time-domain modulated signal at the third sampling rate, wherein the third sampling rate is substantially the same as the second sampling rate if the second sampling rate is substantially the same as the desired sampling rate for the transmitted signal, or the third sampling rate is greater than the second sampling rate if the second sampling rate is lower than desired sampling rate for a transmitted signal, such that to achieve the desired sampling rate for the transmitted signal,
   wherein the transmitted signal is a radio frequency signal based on the analog time-domain modulated signal.

\* \* \* \* \*